Patented June 8, 1948

2,442,760

UNITED STATES PATENT OFFICE 2,442,760

DICHLORODIPHENYLTRICHLOROETHANE AND CYCLOHEXYLDIPHENYLETHER INSECTICIDAL COMPOSITION

Curtis E. Dieter and Bernard J. Thiegs, Midland, Mich., assignors to The Dow Chemical Company, Midland, Mich., a corporation of Delaware No Drawing. Application July 9, 1945, Serial No. 604,102

5 Claims. (Cl. 167—30)

This invention relates to insecticides and is particularly concerned with a novel composition adapted to be employed for the control of both household and agricultural insect pests.

Many synthetic organic compounds have been suggested for use as insecticidal toxicants. Certain of these have found wide acceptance as substitutes for pyrethrins and rotenone, and others have displaced the naturally occurring plant toxicants and inorganic toxicants in preferred pest control practice. The use of such synthetic toxicants presents certain problems. Specificity of action, phytotoxicity, lability, and incompatibility with conventional insecticidal materials have materially restricted operation with many of these compounds.

The compound 1.1-di-(4 - chlorophenyl)-2.2.2-trichloroethane (or DDT) promises to be of great importance for the control of a wide variety of insect pests. However, even with this material there has been observed such specificity of toxic action as seriously interferes with its use in large scale agricultural operations. Thus, this compound may be applied to apple trees infested with codling moth to obtain a good commercial control, but at the same time kills off the parasites and predators which normally operate to keep red spider and aphid populations within reasonable bounds. As a result, these organisms build up to a point where severe damage is sustained by both the tree and the fruit crop. A further disadvantage in the use of DDT resides in the water-repellent and insoluble nature of the compound whereby particles of the latter tend to separate and settle out of aqueous dispersions and homogeneous spray suspensions are maintained with great difficulty.

It is an object of the present invention to provide an improved insecticidal composition comprising a 1.1 - di - (halophenyl) - 2.2.2-trichloroethane, which composition will accomplish the control of common agricultural and household pests with smaller amounts of the substituted ethane compound than would otherwise be required. A further object is to supply a such composition which will be effective against insects not ordinarily controlled by the 1.1-di-(halophenyl)-2.2.2-trichloroethanes, and in which the constituents are mutually activating as regards toxicity to insects and mites so as to accomplish a synergistic result. An additional object is to provide a composition containing a 1.1-di-(halophenyl)-2.2.2-trichloroethane which will be more stable in aqueous dispersion than is the case with compositions at present available. Other objects will become apparent from the following specification and claims.

According to the present invention, a 1.1-di-(halophenyl)-2.2.2-trichloroethane is mixed with cyclohexyl-diphenylether to obtain an improved toxicant composition. When compounded with a carrier in spray and dust compositions, this toxicant mixture exerts a toxicity against insects and mites which is greater than additive with respect to that inherent in the constituents of the mixture when employed alone. Also, the cyclohexyl-diphenylether is a good solvent for the 1.1-di-(halophenyl)-2.2.2-trichloroethane whereby the tendency of the latter to precipitate and separate out of spray mixtures is materially reduced. The mixture of toxicants is effective against organisms which are not controlled by either constituent of the mixture alone. Further advantages reside in the reduced amounts of the toxicant required to give control, and the fact that deposits of the toxicant mixture from simple aqueous dispersions or solvent solutions are substantially invisible whereby the objectionable residues frequently associated with spraying operations are avoided.

The expression "1.1-di-(halophenyl)-2.2.2-trichloroethane" as herein employed, refers to such compounds as 1.1 - di - (2 - chlorophenyl)-2.2.2-trichloroethane, 1.1 - di - (2-bromophenyl)-2.2.2-trichloroethane, 1.1 - di-(4-iodophenyl)-2.2.2-trichloroethane, 1.1 - di-(2.4-dichlorophenyl)-2.2.2-trichloroethane, 1.1 - di-(2.4.5-trichlorophenyl)-2.2.2 - trichloroethane, 1.1-di-(2.4-dibromophenyl)-2.2.2 - trichloroethane, and 1.1 - di-(4-chlorophenyl) - 2.2.2 - trichloroethane. The latter is commonly identified as "DDT," and compositions thereof constitute the preferred embodiment of the invention.

In operating in accordance with the present invention, the new toxicant mixtures are commonly employed along with a carrier in the form of spray and dust compositions. Also, the mixture of toxicants may be so compounded as to produce insecticidal concentrates adapted subsequently to be used in the preparation of spray or dust mixtures.

In the preparation of sprays, the 1.1-di-(halophenyl)-2.2.2-trichloroethane and cyclohexyl-diphenylether may be dissolved one in the other and the resulting mixture dispersed in water or other immiscible solvent. Alternately, the toxicants may be separately dispersed in the water or other carrier. If desired, an organic solvent may be employed as the carrier with the toxicant dissolved therein.

In the preparation of dusts, the toxicant mixture or the toxicants separately may be ground or mixed with the finely-divided carrier in any suitable manner. A convenient mode of operation comprises dissolving the toxicant mixture in a volatile organic solvent, wetting the finely-divided carrier with the solution, and thereafter evaporating the solvent out of the mixture. Suitable solvents for use in such operation include acetone, carbon tetrachloride, benzene, and the like.

In the preparation of concentrates, the mixture of toxicants may be ground with suitable wetting and dispersing agents to obtain products adapted to be dispersed in water or other liquid carrier. Similarly the toxicants may be dissolved in a water-miscible liquid to produce a concentrate adapted subsequently to be incorporated into aqueous spray mixtures. A further type of concentrate consists of a dispersion of the toxicant mixture in a finely-divided solid carrier. In such mixture a high percentage of the toxicant is employed and the product may be subsequently dispersed in water to produce aqueous spray mixtures or further diluted with additional carrier to produce dusts.

Any suitable proportion of the cyclohexyl-diphenylether may be employed in combination with the 1.1 - di - (halophenyl) -2.2.2 - trichloroethane. The preferred amounts of materials are dependent upon the type of composition in which the toxicant mixture is to be applied, the nature of the organism to be controlled, and the particular 1.1-di - (halophenyl) - 2.2.2 - trichloroethane employed. In general, from about 0.5 to 10 parts by weight of cyclohexyl-diphenylether is employed for each part of 1.1-di-(halophenyl)-2.2.2-trichloroethane. In mixtures containing 1.1-di - (4-chlorophenyl) - 2.2.2 - trichloroethane and cyclohexyl-diphenylether within this range of proportions, the latter serves as a solvent for the substituted ethane compound whereby the tendency of the latter to separate out of aqueous dispersions is materially reduced. Also, the compounds exercise a mutual activation one for the other so that compositions containing the mixture are characterized by an effectiveness against insects and mites which is greater than additive.

The amount of the toxicant mixture employed in spray mixtures varies considerably with the particular organism to be controlled. In general, from about 0.1 to 10 pounds of the mixture per 100 gallons of water or other liquid carrier gives good results. In dust compositions, the mixture should be employed in the amount of from 0.01 to 5.0 per cent by weight of the ultimate composition. Depending upon whether a concentrate is in the form of a solution, dust dispersion, or simple mixture of the toxicant with wetting and dispersing agents, from 5 to 98 per cent by weight of the toxicant mixture may be employed therein.

Any suitable wetting, emulsifying, or dispersing agent may be used with the toxicant mixture provided only that it accomplish the end desired and not be reactive with the ingredients of the mixture. Representative products which have been found satisfactory include di-octyl sodium sulphosuccinate (Aerosol OT), polyethylene glycol-phenyl-isooctyl ether (Triton X-100), polyoxyalkylene derivatives of sorbitan trioleate (Tween 85), etc.

In the preparation of liquid concentrates, miscible solvents such as acetone, dioxane, and the like are conveniently employed. In spray compositions, the toxicant mixture may be dispersed or dissolved in oil-water emulsion compositions, alcohol, acetone, chlorinated hydrocarbons, kerosene, and the like, instead of water.

Solid carriers which may be employed in the preparation of dust or concentrate products include diatomaceous earth, clays, talc, charcoal, wood flour, pyrophyllite, volcanic ash, and the like.

The mixtures of cyclohexyl-diphenylether and 1.1-di - (halophenyl) - 2.2.2 - trichloroethane and compositions in which they are incorporated may be further modified with other parasiticidal materials. Representative of such further toxic additaments are rotenone, pyrethrins, organic thiocyanates, lead arsenate, nicotine sulphate, sulfur, and the like.

Cyclohexyl-diphenylether, as herein employed, is conveniently prepared by the reaction of cyclohexene with diphenylether in the presence of a catalyst such as activated bleaching earth (Retrol). The product with which the present invention is particularly concerned is that boiling at 200°–230° C. at 20 milliliters pressure and consisting essentially of monocyclohexyl-diphenylether. The preparation and properties of this product are described in U. S. Patent No. 2,195,383.

The following examples illustrate the invention but are not to be construed as limiting:

EXAMPLE 1

A basic composition was prepared consisting of 15 parts by weight of Aerosol OT (di-octyl sodium sulfosuccinate) and 85 parts of acetone. This was employed as a control composition in the evaluation of mixtures of cyclohexyl-diphenylether with 1.1-di-(4-chlorophenyl)-2.2.2-trichloroethane. When applied against adult greenhouse red spider on cranberry beans, this composition, at 1.0 pounds per 100 gallons of water, gave kills of from 26 to 34 per cent. At 2 pounds of the composition per 100 gallons, the kills ranged from 42 to 52 per cent.

Varying amounts of 1.1-di-(4-chlorophenyl)-2.2.2-trichloroethane and of cyclohexyl-diphenylether were substituted for a portion of the acetone in the basic composition to obtain insecticidal concentrates which were applied for control of red spider. The results so obtained were expressed in terms of per cent control in relation to the kill obtained with the basic composition. This is in accordance with the Abbott type formula as suggested by the Insecticide and Fungicide Board of the United States Bureau of Entomology. The Abbott formula is $$\text{Control} = \left(\frac{X-Y}{X}\right)100$$

wherein X represents the percentage of organisms left alive by treatment with the basic composition and Y represents the percentage of larvae left alive after treatment with the composition containing the toxicant or toxicants. The result represents the control attributable to the presence of the toxicants (compared to the basic composition as zero).

The following compositions are illustrative of those prepared:

*Composition A*

| | Parts by weight |
|---|---|
| Cyclohexyl-diphenylether | 50 |
| Acetone | 35 |
| Aerosol OT | 15 |

Composition B

| | Parts by weight |
|---|---|
| 1.1-di-(4-chlorophenyl)-2.2.2-trichloroethane | 25 |
| Acetone | 60 |
| Aerosol OT | 15 |

Composition C

| | Parts by weight |
|---|---|
| Cyclohexyl-diphenylether | 50 |
| 1.1-di-(4-chlorophenyl)-2.2.2-trichloroethane | 25 |
| Acetone | 10 |
| Aerosol OT | 15 |

Composition A gave a control of 62 percent attributable to the presence of the cyclohexyl-diphenylether. Composition B gave a control of 14 per cent attributable to the presence of the 1.1-di-(4-chlorophenyl)-2.2.2-trichloroethane. The predictable control for the combination of toxicants in Composition C was 76 per cent. The actual control attributable to the presence of 1.1-di-(4-chlorophenyl)-2.2.2-trichloroethane and cyclohexyl-diphenylether in Composition C was found to be 93 per cent.

Similar determinations were carried out in which Compositions A, B, and C were employed at 1 pound per 100 gallons of water. The control obtained with Composition A attributable to the presence of the cyclohexyl-diphenylether was 38 per cent. With Composition B, the control of red spider attributable to the presence of 1.1-di-(4-chlorophenyl)-2.2.2-trichloroethane was zero. The control obtained with Composition C, attributable to the presence of the combined toxicants, was 84 per cent.

EXAMPLE 2

The basic composition, as described in Example 1, was modified with monocyclohexyl-diphenylether and 1.1-di-(4-chlorophenyl)-2.2.2-trichloroethane to produce other insecticidal compositions as follows:

Composition D

| | Parts by weight |
|---|---|
| Cyclohexyl-diphenylether | 25 |
| Acetone | 60 |
| Aerosol OT | 15 |

Composition E

| | Parts by weight |
|---|---|
| 1.1-di-(4-chlorophenyl)-2.2.2-trichloroethane | 25 |
| Acetone | 60 |
| Aerosol OT | 15 |

Composition F

| | Parts by weight |
|---|---|
| 1.1-di-(4-chlorophenyl)-2.2.2-trichloroethane | 25 |
| Cyclohexyl-diphenylether | 25 |
| Acetone | 35 |
| Aerosol OT | 15 |

With Composition D, at 2.0 pounds per 100 gallons of water, the red spider control attributable to cyclohexyl-diphenylether was 21 per cent. A control of 14 per cent attributable to 1.1-di-(4-chlorophenyl)-2.2.2-trichloroethane was obtained with Composition E. While the expected control with the combination of toxicants was only 35 per cent, Composition F, at 2.0 pounds per 100 gallons, gave a control of 64 per cent attributable to the mixture of toxicants.

EXAMPLE 3

Dust mixtures were prepared in which 1.1-di-(4-chlorophenyl)-2.2.2-trichloroethane, cyclohexyl-diphenylether, and mixtures of the two toxicants were dispersed in and on pyrophyllite. In the preparation of these products, the toxicant materials were dissolved in carbon tetrachloride, the pyrophyllite wet with the resulting solutions, and the wet pyrophyllite mixtures thereafter dried to remove solvent. The resulting finely-divided products were dusted on bean plants, and the plants infested with Mexican bean beetle larvae. The bean plants were inspected 72 hours after treatment to determine the per cent control of the beetle larvae and the amount of damage done to the foliage by the feeding of the larvae.

A dust containing 2.5 per cent by weight of 1.1-di-(4-chlorophenyl)-2.2.2-trichloroethane was found to have accomplished a 43 per cent control of the larvae and to have permitted 15 per cent feeding. A dust containing 2.5 per cent by weight of the cyclohexyl-diphenylether gave zero per cent control of the larvae and permitted 95 per cent feeding. A dust containing 2.5 per cent each of 1.1-di-(4-chlorophenyl)-2.2.2-trichloroethane and cyclohexyl-diphenylether accomplished 73 per cent control of the larvae and permitted only 7 per cent feeding.

EXAMPLE 4

Other compositions which may be prepared as heretofore described and employed for the control of insect and mite pests include the following:

Composition G

| | Parts by weight |
|---|---|
| 1.1-di-(4-chlorophenyl)-2.2.2-trichloroethane | 20 |
| Aerosol OT | 2 |
| Cyclohexyl-diphenylether | 78 |

This composition is adapted to be dispersed in water to produce aqueous spray mixtures for the control of Colorado potato-beetle, codling moth, and red spider.

Composition H

| | Parts by weight |
|---|---|
| 1.1-di-(4-chlorophenyl)-2.2.2-trichloroethane | 1 |
| Cyclohexyl-diphenylether | 10 |
| Kerosene | 89 |

This composition is employed for the control of flies, clothes moths, cockroaches, and other household insect pests. It has the advantage that the 1.1-di-(4-chlorophenyl)-2.2.2-trichloroethane does not crystallize out of solution in the spray mixture on standing and that residues are not of such a crystalline nature as to be readily dissipated from treated surfaces.

Composition I

| | Parts by weight |
|---|---|
| 1.1-di-(4-bromophenyl)-2.2.2-trichloroethane | 3 |
| Cyclohexyl-dihenylether | 3 |
| Petroleum ether | 94 |

This composition is adapted to be employed for the moth-proofing of wearing apparel.

Composition J

| | Parts by weight |
|---|---|
| 1.1-di-(4-iodophenyl)-2.2.2-trichloroethane | 25 |
| Aerosol OT | 15 |
| Acetone | 10 |
| Cyclohexyl-diphenylether | 50 |

This composition is a concentrate which may subsequently be diluted with water to produce a spray mixture for the control of mosquito and mosquito larvae.

Composition K

| | Parts by weight |
|---|---|
| 1.1-di-(2.4-dichlorophenyl)-2.2.2-trichloroethane | 1 |
| Cyclohexyl-diphenylether | 4 |
| Walnut shell flour | 95 |

This composition is a dust and may be applied in conventional dusting operations for the control of such organisms as Colorado potato beetle and leaf hopper.

We claim:

1. An insecticidal composition including as active toxicants a 1.1-di-(chlorophenyl)-2.2.2-trichloroethane and monocyclohexyl-diphenylether.

2. An insecticidal composition including as active toxicants 1.1-di-(4-chlorophenyl)-2.2.2-trichloroethane and monocyclohexyl-diphenylether.

3. An insecticidal composition including as active toxicants 1.1-di-(4-chlorophenyl)-2.2.2-trichloroethane and from 0.5 to 10 parts by weight of mono cyclohexyl-diphenylether for each part by weight of 1.1-di-(4-chlorophenyl)-2.2.2-trichloroethane.

4. An insecticidal spray including an aqueous dispersion of a 1.1-di-(chlorophenyl)-2.2.2-trichloroethane and monocyclohexyl-diphenylether.

5. An insecticidal dust including a finely-divided carrier and dispersed thereon as active toxicants a 1.1-di-(chlorophenyl)-2.2.2-trichloroethane and monocyclohexyl-diphenylether.

CURTIS E. DIETER.
BERNARD J. THIEGS.

REFERENCES CITED

The following references are of record in the file of this patent:

UNITED STATES PATENTS

| Number | Name | Date |
|---|---|---|
| Re. 22,700 | Muller | Dec. 4, 1945 |
| 2,190,656 | Fletcher | Feb. 20, 1940 |
| 2,243,207 | Harvill | May 27, 1941 |

FOREIGN PATENTS

| Number | Country | Date |
|---|---|---|
| 502,320 | Great Britain | Mar. 15, 1939 |